United States Patent
Byers

(10) Patent No.: US 9,561,838 B1
(45) Date of Patent: Feb. 7, 2017

(54) BARGE COUPLING DEVICE

(71) Applicant: Robert Byers, Jena, LA (US)

(72) Inventor: Robert Byers, Jena, LA (US)

(*) Notice: Subject to any disclaimer, the term of this patent is extended or adjusted under 35 U.S.C. 154(b) by 0 days.

(21) Appl. No.: 14/852,528

(22) Filed: Sep. 12, 2015

(51) Int. Cl.
*B63B 21/56* (2006.01)

(52) U.S. Cl.
CPC .................... *B63B 21/56* (2013.01)

(58) Field of Classification Search
CPC .......... B63B 21/00; B63B 21/04; B63B 21/06; B63B 21/56; B63B 21/58; B63B 21/62
USPC ......................................... 114/248, 249, 251
See application file for complete search history.

(56) References Cited

U.S. PATENT DOCUMENTS

| | | | | |
|---|---|---|---|---|
| 1,231,067 A * | 6/1917 | Sansom | .................. | B63B 21/62 114/251 |
| 2,917,018 A * | 12/1959 | Knight | .................... | B63B 21/62 114/251 |
| 3,785,324 A * | 1/1974 | Guthans | .................. | B63B 21/62 254/264 |
| 4,048,938 A * | 9/1977 | Patterson, III | ........ | B63B 25/004 114/75 |
| 4,078,514 A * | 3/1978 | Patterson, III | .......... | B63B 21/00 114/249 |
| 4,100,875 A * | 7/1978 | Patterson, III | .......... | B63B 21/00 114/251 |
| 4,487,094 A * | 12/1984 | Wilkens | .................. | B63B 21/62 81/57.39 |

* cited by examiner

*Primary Examiner* — Lars A Olson
(74) *Attorney, Agent, or Firm* — Gulf Coast Intellectual Property Group

(57) ABSTRACT

A barge-coupling device that is operable to assist in the tightening of cables that are utilized to secure two marine vessels together in preparation for towing. The barge-coupling device further includes a tubular body having a first end and a second end. A hollow bore is present through the tubular body extending between the first end and second end. A first shaft and a second shaft are movably mounted to the tubular body. A handle is included having a lower portion wherein the lower portion has disposed therein a first gear and a second gear. The first gear is operably coupled to the tubular body and the second gear is mounted above the first gear and operably coupled thereto. A keeper rotatably mounted the second gear and is configured to couple with a power tool so as to rapidly rotate the second gear.

11 Claims, 3 Drawing Sheets

__US 9,561,838 B1__

BARGE COUPLING DEVICE

FIELD OF THE INVENTION

The present invention relates generally to connection apparatus, more specifically but not by way of limitation, a barge-coupling device that is operable to facilitate the rapid coupling of marine vessels such as but not limited to barges for towing.

BACKGROUND

Shipping of bulk goods such as but not limited to chemicals and other commodities is accomplished utilizing various forms of transportation such as but not limited to rail, tractor-trailers and marine shipping. The latter includes vessels such as but not limited to tankers and barges. Barges are typically utilized along coastal areas and in major rivers to transport the aforementioned items and other goods from producers to ports and/or customers. Barges are known in the art and are containers vessels that require to either be towed or pushed with a tugboat.

One problem that is encounter when towing/pushing barges is the requirement to couple many barges together for movement thereof. It is common for barges to be placed either beam-to-beam or arranged in a forward-aft pattern. The operable coupling of these barges is typically accomplished by cables and/or ropes and requires several deckhands to accomplish the task. These cables or ropes are secured and tightened utilizing a device commonly known as a tugboat ratchet. The tugboat ratchet includes a rotatable tubular body having a reciprocating handle secured thereto. While these devices are effective, they have proven to be time consuming to use. Depending on the conditions and the skill of the deckhands, the coupling of the barges can be a labor-intensive task that can consume time.

Accordingly, there is a need for a barge-coupling device that is operable to facilitate a more efficient coupling of at least two barges in preparation for the barges to be towed together.

SUMMARY OF THE INVENTION

It is the object of the present invention to provide a barge coupling device that includes a tubular body having a first end and a second end wherein the tubular body is hollow having a bore extending intermediate the first end and the second end.

An additional object of the present invention is to provide a barge-coupling device that includes a handle having a first side plate and a second side plate secured so as to have a void therebetween.

Another object of the present invention is to provide a barge-coupling device that further includes a first attachment member wherein the first attachment member is operably secured to the first end of the tubular body.

A further object of the present invention is to provide a barge-coupling device that includes a second attachment member operably coupled to the second end of the tubular body.

Still another object of the present invention is to provide a barge-coupling device wherein the first attachment member and the second attachment member are movably secured to the tubular body.

An additional object of the present invention is to provide a barge-coupling device that further includes a first gear and a second gear disposed within the void intermediate the first side plate and the second side plate of the handle, and wherein the first gear is operably coupled to the tubular body.

Yet a further object of the present invention is to provide a barge-coupling device wherein the second gear includes a drive bolt operably coupled thereto.

Still another object of the present invention is to provide a barge-coupling device that is operable to facilitate an efficient coupling of barges in preparation for towing wherein the drive bolt coupled to the second gear is configured to be connected with an impact wrench or other power operated mechanical tool.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
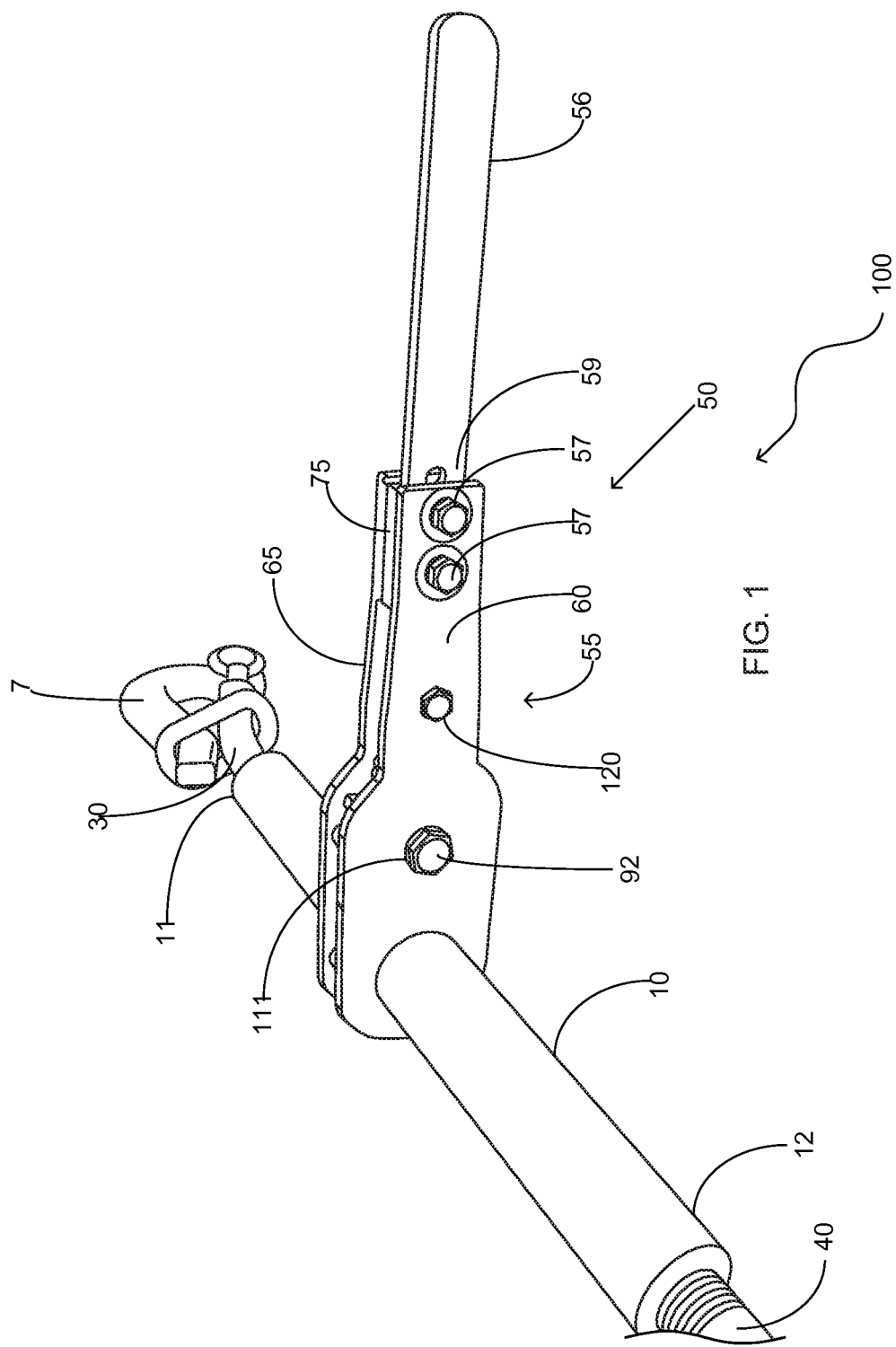
FIG. 1 is a side view of the preferred embodiment of the present invention.
Figure 2:
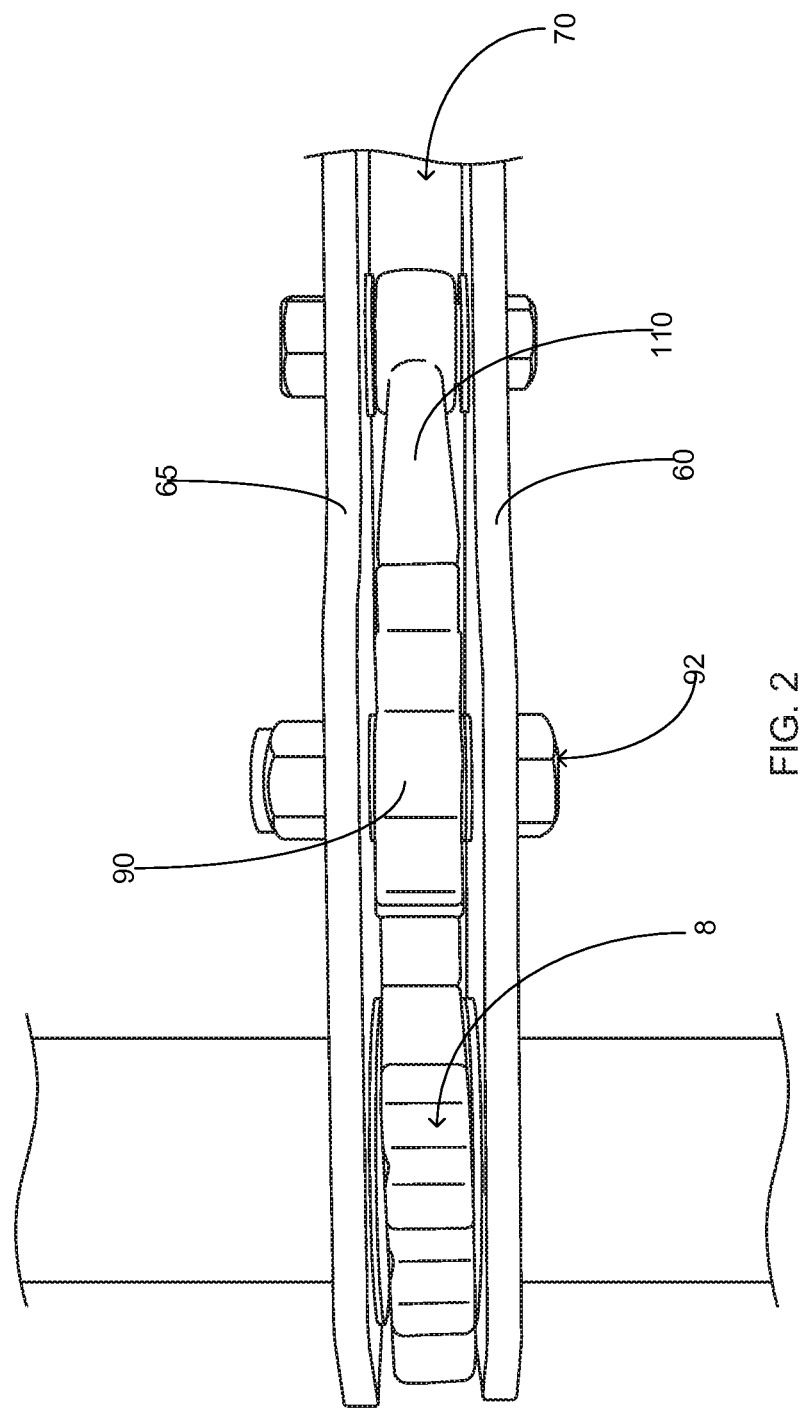
FIG. 2 is a detailed view of the lower portion of the handle of the present invention.

Referring now to the drawings submitted herewith, wherein various elements depicted therein are not necessarily drawn to scale and wherein through the views and figures like elements are referenced with identical reference numerals, there is illustrated a barge-coupling device 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1, the barge coupling device 100 includes a tubular body 10. The tubular body 10 is cylindrical in shape having a hollow bore therethrough (not illustrated herein). The tubular body 10 is manufactured from a suitable durable material such as but not limited to metal and includes a first end 11 and a second end 12. The tubular body 10 is similar to conventional tugboat wrenches wherein the hollow bore of the tubular body includes an inner surface that has opposing threads formed therein so as to facilitate the inward and/or outward movement of the first shaft 30 and second shaft 40 during rotational movement of the tubular body 10.

The first shaft 30 includes a first attachment member 7. It is contemplated within the scope of the present invention that the first attachment member 7 could be a conventional pelican hook or numerous other types of mechanical fasteners. The first shaft 30 is movably coupled to the tubular body 10 as described herein so as to move in an inward or outward direction based upon the reciprocating movement of the handle 50. The second shaft 40 is also movably mounted within the tubular body 10 similarly as the first shaft 30. And while not illustrated herein includes an attachment member similar to the first attachment member 60 that is operable to engage a cable or rope being utilized to secure two marine vessels together.

Still referring to FIG. 1, the barge-coupling device 100 includes handle 50 having a lower portion 55 and an upper portion 66. The lower portion 55 includes a first side plate 60 and a second side plate 65 having a void 70 therebewteen. The first side plate 60 and second side plate 65 are manufactured from a suitable durable material such as but not limited to metal. Upper portion 56 is secured to lower portion 55 via fasteners 57. Fasteners 57 are conventional bolts such as but not limited to one-half inch diameter bolts that are journaled through an upper aperture 48 and a lower aperture 49. While two fasteners 57 are illustrated herein, it is contemplated within the scope of the present invention that any number of fasteners 57 could be utilized to secure the upper portion 56 to the lower portion 55. A union 75 is operable to facilitate the secure coupling of the upper portion 56 and lower portion 55. The union 75 is manufactured from a suitable durable material such as but not limited to metal plate and is square u-shaped so as to mateably receive end 59 of the upper portion 56.

Figure 3:
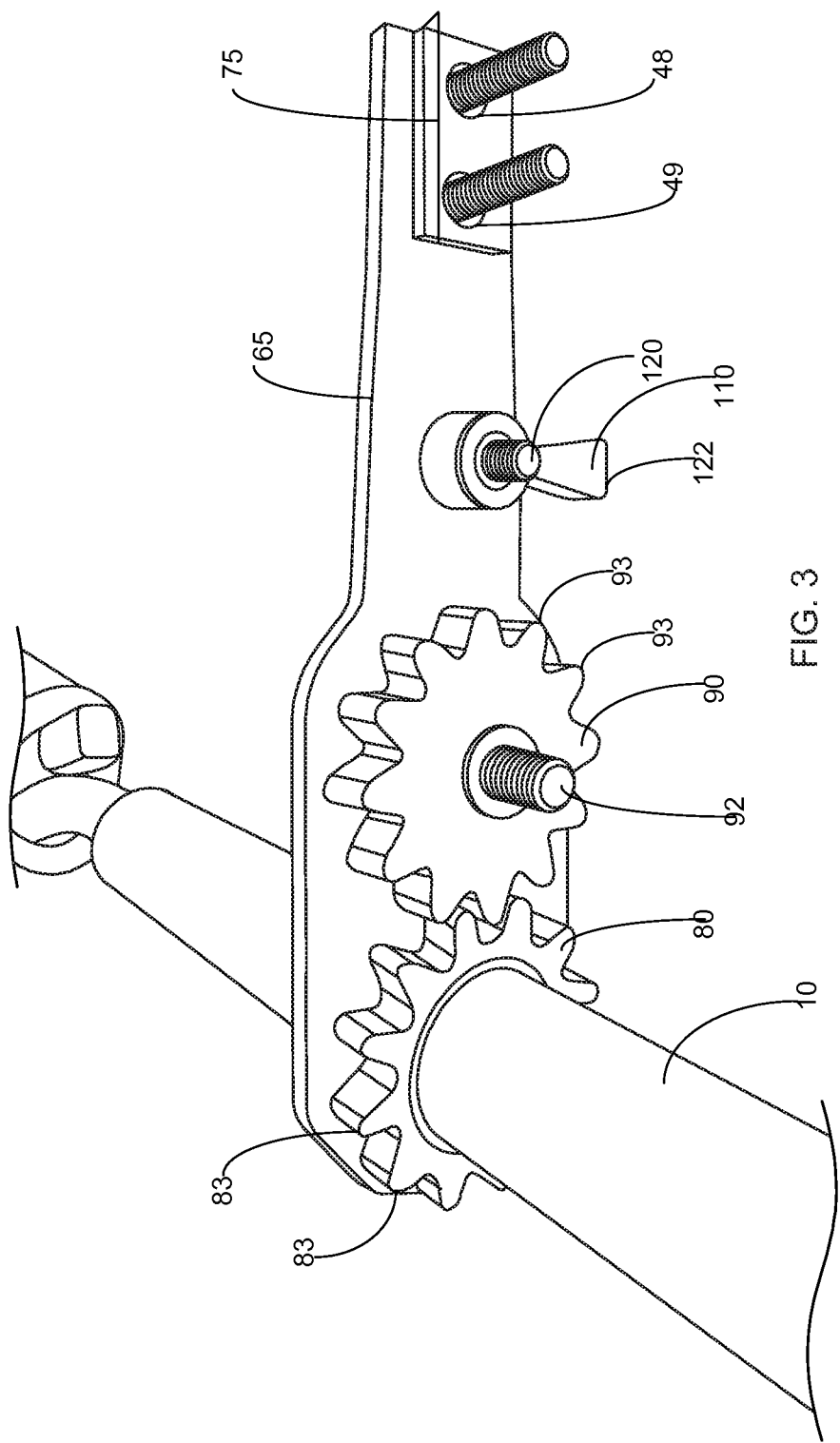
FIG. 3 is a detailed view of the gear assembly disposed within the lower portion of the handle.

Now referring in particular to FIG. 3 herein, the barge-coupling device 100 includes first gear 80 and second gear 90 that are operable to facilitate the rotational movement of the tubular body 10. The first gear 80 is a conventional pinion gear that is surroundably mounted to the tubular body 10 and is secured through standard techniques so as to facilitate the rotational movement thereof. The lower portion 55 further includes a second gear 90. The second gear 90 is secured to the lower portion 55 using keeper 92 and includes teeth 93 that are operably engaged with teeth 83 of the first gear 80. The rotational movement of the second gear 90 facilitates the rotational movement of the first gear 80 and thus the rotational movement of the tubular body 10 and as previously described herein the inward-outward movement of the first shaft 30 and second shaft 40. The second gear 90 functions so as to allow a more rapid rotation of the tubular body 10 so as to take up initial slack in any cable or rope operably coupled thereto being utilized for securing two marine vessels. The barge-coupling device 100 is manually operated by the reciprocal movement of the handle 50 and during this reciprocal movement latch 110 engages teeth 93 and provides a partial rotation of the second gear 90 which drives the movement of the first gear 80 and tubular body 10. This procedure can be quite time consuming and does not provide the necessary speed required on some occasions to initially take in cable or rope attached to the barge-coupling device 100. The keeper 92 includes head 111 that is configured to be operably coupled to a device such as but not limited to an impact wrench. The keeper 92 is rotatably coupled to the lower portion 55 of the handle 50 in order to facilitate a rapid rotation of the second gear 90. Keeper 92 while not illustrated herein, is coupled to the second gear 90 utilizing a conventional key or tab technique so as to maintain engagement and orientation therewith. The aforementioned coupling technique ensures rotation of the second gear 90 as the keeper 92 is rotated. A user can engage the head 111 of the keeper 92 with an impact wrench or similar device and rapidly rotate the second gear 90 and subsequent any initial slack requiring lower torque movement, the handle 50 is moved reciprocally so as to complete the tightening of any rope of cable attached to the barge-coupling device 100. The latch 110 secured utilizing bolt 120 and is operable to be positioned intermediate teeth 93 and functions to assist in the higher torque movements of the barge-coupling device 100.

The barge-coupling device 100 has a first operational mode and a second operational mode. In its first operational mode the head 111 of the keeper 92 is operably coupled to an impact wrench or other similar power tool and is rapidly rotated so as to facilitate a faster rotation of the second gear 90, first gear 80 and tubular body 10 thus moving the first shaft 30 and second shaft 40 (and attachment members coupled thereto) quickly. This first operational mode is utilized during lower torque requirements such as taking in of initial slack of a cable or rope. The second operational mode is utilized during higher torque requirements. In the second operational mode, the handle 50 is reciprocally moved and the latch 110 engages the teeth 93 of the second gear 90 providing increased leverage so as to rotate the second gear 90 during higher torque requirements.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A barge coupling device that is operable to facilitate the securing of at least two barges comprising:
 a tubular body, said tubular body being cylindrical in shape having a first end and a second end, said tubular body having a hollow bore extending therethrough intermediate said first end and said second end;
 a first shaft and a second shaft, said first shaft and said second shaft movably mounted to said tubular body, said first shaft and said second shaft having an attachment member secured thereto configured to engage a rope or cable;
 a handle, said handle having a lower portion and an upper portion, said lower portion of said handle being operably coupled to said tubular body, said lower portion further having a first side plate and a second side plate and a void therebetween, said lower portion of said handle further having a first gear, said first gear being operably coupled to said tubular body, said handle further including a second gear, said second gear being operably coupled to said first gear;
 a keeper, said keeper being journaled through said first side plate and said second side plate, said keeper being operably coupled to said second gear, said keeper further having a head, said head being adjacent to said second plate opposite said void, said head being configured to operably couple with a power wrench; and
 wherein the barge-coupling device has a first operational mode and a second operational mode wherein in the first operational mode the second gear and the first gear are rotated utilizing the power wrench wherein the power wrench is operably secured to said head of said keeper.

2. The barge coupling device as recited in claim 1, and further including a union, said union operable to facilitate the coupling of the upper portion of said handle to said lower portion of the handle, said union being square u-shaped.

3. The barge coupling device as recited in claim 2, and further including a latch, said latch being positioned above said second gear, said latch being operably engaged with said second gear during said second operational mode.

4. The barge coupling device as recited in claim 3, and further including at least one fastener, said at least one fastener operable to couple the upper portion of the handle to the lower portion of the handle.

5. The barge coupling device as recited in claim 4, wherein in said second operational mode the tubular body is rotatably moved via a reciprocating movement of the handle.

6. A marine vessel coupling device that is operable to facilitate the tightening of a cable that is being utilized to secure two marine vessels to each other in preparation for towing comprising:
 a tubular body, said tubular body being cylindrical in shape having a first end and a second end, said tubular body having a hollow bore extending therethrough intermediate said first end and said second end;
 a first shaft and a second shaft, said first shaft and said second shaft movably mounted to said tubular body, said first shaft and said second shaft having an attachment member secured thereto configured to engage a rope or cable, said first shaft and said second shaft operable to move in an inward-outward direction with respect to the tubular body;
 a handle, said handle having a lower portion and an upper portion, said lower portion of said handle being operably coupled to said tubular body, said lower portion further having a first side plate and a second side plate and a void therebetween, said first side plate having an inner surface and an outer surface, said second side plate having an inner surface and an outer surface;
 a first gear, said first gear being mounted within said void of said lower portion of said handle, said first gear being operably coupled to said tubular body facilitating the rotational movement thereof;
 a second gear, said second gear being operably coupled to said first gear, said second gear being secured above said first gear, said second gear being mounted to said lower portion of said handle with a keeper, said keeper being journaled through said first side plate and said second side plate, said keeper further having a head, said head being adjacent to said second plate proximate the outer surface thereof, said head being configured to operably couple with a power wrench; and
 wherein the barge-coupling device has a first operational mode and a second operational mode wherein the first operational utilizes the power wrench wherein the power wrench is operably secured to said head of said keeper to rotate said second gear.

7. The marine vessel coupling device as recited in claim 6, and further including a latch, said latch being positioned above said second gear, said latch being operably engaged with said second gear during said second operational mode.

8. The marine vessel coupling device as recited in claim 7, wherein in said second operational mode the tubular body is rotatably moved via a reciprocating movement of the handle.

9. The marine vessel coupling device as recited in claim 8, and further including a union, said union operable to facilitate the coupling of the upper portion of said handle to said lower portion of the handle, said union being square u-shaped.

10. The marine vessel coupling device as recited in claim 9, and further including a pair of fasteners, said pair of fasteners operable to couple the upper portion of the handle to the lower portion of the handle.

11. The marine vessel coupling device as recited in claim 10, wherein said keeper and said second gear utilize a tab engagement so as to maintain orientation therebetween.

* * * * *